(12) United States Patent
Xiao

(10) Patent No.: US 11,809,240 B1
(45) Date of Patent: Nov. 7, 2023

(54) OVERTURNING AND SUPPORTING ROTATING SHAFT FOR TABLET COMPUTER

(71) Applicant: Guangdong Zhongqiang Elite Electronic Technology Co., Ltd, Guangdong (CN)

(72) Inventor: Songlin Xiao, Guangdong (CN)

(73) Assignee: Guangdong Zhongqiang Elite Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 17/845,747

(22) Filed: Jun. 21, 2022

(51) Int. Cl.
  *G06F 1/16* (2006.01)
  *E05D 3/18* (2006.01)

(52) U.S. Cl.
  CPC ............. *G06F 1/1681* (2013.01); *E05D 3/18* (2013.01); *E05Y 2900/606* (2013.01)

(58) Field of Classification Search
  CPC .................................. E05D 3/18; G06F 1/1681
  See application file for complete search history.

(56) References Cited

U.S. PATENT DOCUMENTS

| | | | | |
|---|---|---|---|---|
| 10,664,021 B1 * | 5/2020 | Hsu | ........................ | G06F 1/1626 |
| 11,408,214 B1 * | 8/2022 | Hsu | ........................... | E05D 3/18 |
| 2016/0097227 A1 * | 4/2016 | Hsu | ........................ | F16M 13/005 16/354 |
| 2019/0011957 A1 * | 1/2019 | Wendt | ................... | E05D 11/082 |
| 2019/0390703 A1 * | 12/2019 | Hsu | ......................... | F16C 11/04 |
| 2020/0103935 A1 * | 4/2020 | Hsu | ........................ | G06F 1/1681 |
| 2020/0371561 A1 * | 11/2020 | Lin | ...................... | E05D 11/1014 |
| 2021/0381289 A1 * | 12/2021 | Hsu | ........................ | H04M 1/022 |
| 2022/0083106 A1 * | 3/2022 | Su | ........................... | G06F 1/1681 |
| 2022/0412138 A1 * | 12/2022 | Peng | .................... | G06F 1/1681 |
| 2023/0067187 A1 * | 3/2023 | Lin | ........................ | G06F 1/1681 |

* cited by examiner

*Primary Examiner* — Jason W San
(74) *Attorney, Agent, or Firm* — Nitin Kaushik

(57) ABSTRACT

The disclosure discloses an overturning and supporting rotating shaft for a tablet computer. The overturning and supporting rotating shaft includes a fixed support, wherein a connecting fixed part is arranged in the fixed support; the connecting fixed part includes a fixed portion, and an arc-shaped installing portion is connected to one side of the fixed portion and is inserted into a connecting plate; a first arc-shaped installing groove is formed in the connecting plate; the connecting plate is inserted into a movable support, and a second arc-shaped installing groove is formed in the movable support; a torsion washer is arranged between each side of the movable support and the fixed support. The rotation of the overturning and supporting rotating shaft within a range of 120 degrees is realized by matching of arc-shaped structures among each assembly, and movement assisted by connecting the torsion gaskets and the fixed support.

4 Claims, 3 Drawing Sheets

OVERTURNING AND SUPPORTING ROTATING SHAFT FOR TABLET COMPUTER

TECHNICAL FIELD

The disclosure relates to the technical field of computer parts and equipment, and particularly relates to an overturning and supporting rotating shaft for a tablet computer.

BACKGROUND ART

More and more tablet computers are applied into the homes of ordinary users, but traditional tablet computers are not provided with external supporting mechanisms, or achieve a supporting function by other methods such as adding extra shells, thus, the size of the tablet computer is invisibly increased, the portability and aesthetics of the tablet computer are greatly reduced, the degree of overturning is low, and the tablet computers are inconvenient to use.

SUMMARY OF THE INVENTION in view of the above defects, the problem to be solved by the disclosure is to provide an overturning and supporting rotating shaft for a tablet computer. The overturning and supporting rotating shaft can be overturned within a range of 0 to 120 degrees, is convenient to use, and meanwhile, enables a bracket support of the whole machine to fit better with a rear shell. The overturning and supporting rotating shaft is attractive in appearance, neat, small in size and long in service life.

In order to solve the above problems, the technical solution of the disclosure is as follows:

the overturning and supporting rotating shaft for the tablet computer comprises a fixed support, wherein a connecting fixed part is fixedly arranged in the fixed support by a fastener;

the connecting fixed part comprises a fixed portion, and the fixed portion is fixedly arranged in the fixed support; an arc-shaped installing portion is connected to one side of the fixed portion, and the installing portion is inserted into a connecting plate;

a first arc-shaped installing groove is formed in the connecting plate, and the installing portion is inserted into the first installing groove; first arc-shaped sliding blocks are arranged in the first installing groove; first slideways corresponding to the first sliding blocks are arranged in the installing portion the connecting plate is inserted into a movable support, and the movable support is located in the fixed support; a second arc-shaped installing groove is formed in the movable support, and the connecting plate is inserted into the second installing groove; second arc-shaped sliding blocks are arranged in the second installing groove, and second slideways corresponding to the second sliding blocks are arranged on the connecting plate; and a torsion washer is arranged between each side of the movable support and the fixed support, one side of each of the torsion gaskets is slidably arranged on the fixed support, and the other side of each of the torsion gaskets and the movable support are in hinged connection.

As an improvement, kidney-shaped holes are formed in the fixed support, and sliding blocks are slidably arranged in the kidney-shaped holes and are fixedly arranged on the torsion gaskets.

As an improvement, a connecting fixed shaft is fixedly arranged between two torsion gaskets.

As an improvement, a fixed shaft for supporting the fixed support is fixedly arranged between both ends of the fixed support.

After the above technical solution is adopted, the disclosure has the following beneficial effects:

The overturning and supporting rotating shaft for the tablet computer comprises a fixed support, wherein a connecting fixed part is fixedly arranged in the fixed support by a fastener; the connecting fixed part comprises a fixed portion which is fixedly arranged in the fixed support; an arc-shaped installing portion is fixedly connected to one side of the fixed portion and is inserted into a connecting plate; a first arc-shaped installing groove is formed in the connecting plate, and the installing portion is inserted into the first installing groove; first arc-shaped sliding blocks are arranged in the first installing groove, and first slideways corresponding to the first sliding blocks are arranged in the installing portion;

the connecting plate is inserted into the movable support which is located in the fixed support; a second arc-shaped installing groove is formed in the movable support, and the connecting plate is inserted into the second installing groove; second arc-shaped sliding blocks are arranged in the second installing groove, and second slideways corresponding to the second sliding blocks are arranged on the connecting plate; and a torsion washer is arranged between each side of the movable support and the fixed support, one side of each torsion gasket is slidably arranged on the fixed support, and the other side of each torsion gasket and the movable support are in hinged connection. The rotation of the overturning and supporting rotating shaft within a range of 120 degrees is realized by matching of arc-shaped structures among the connecting fixed part, the connecting plate and the movable support, and movement assisted by connecting the torsion gaskets and the fixed support.

The kidney-shaped holes are formed in the fixed support, the sliding blocks are slidably arranged in the kidney-shaped holes and are fixedly arranged on the torsion gaskets, when the movable support is overturned, due to the change of the center, the sliding structure is simple by adopting the design of the kidney-shaped holes, and meanwhile, the adjustment allowance is reserved, the successful implementation of overturning is ensured.

As the connecting fixed shaft is fixedly arranged between the two torsion gaskets, the lateral deviation in the overturning process is prevented.

The fixed shaft for supporting the fixed support is fixedly arranged between both ends of the fixed support, thus, the fixed support is further stabilized, and the successful implementation of the overturning is ensured.

In conclusion, the disclosure solves the defects in the prior art that the portability and aesthetics are affected by adding the extra shell, the overturning and supporting rotating shaft can be overturned within a range of 0 to 120 degrees, is convenient to use, and meanwhile, enables a bracket support of the whole machine to fit better with the rear shell. The overturning and supporting rotating shaft is attractive in appearance, neat, small in size and long in service life.

Figure 1:
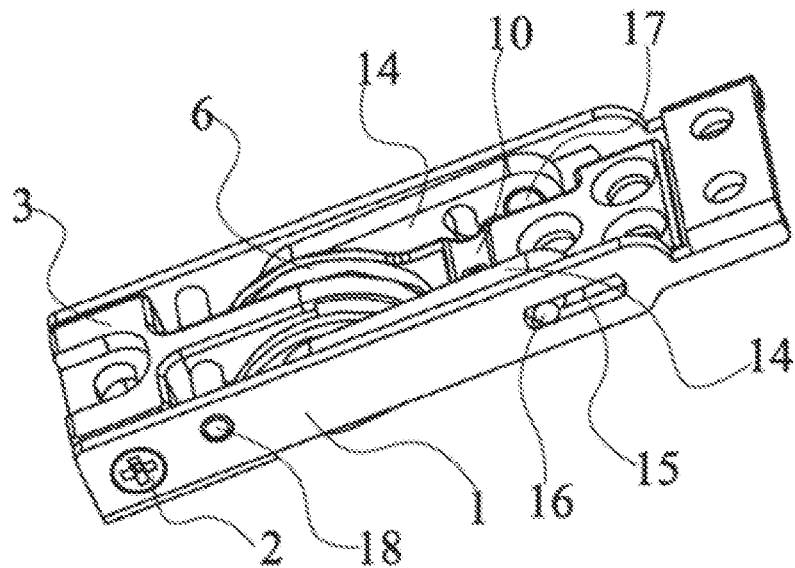
FIG. 1 is a structural schematic diagram after assembly of the disclosure.

In the drawings, 1. Fixed support; 2. Fastener; 3. Connecting fixed part; 4. Fixed portion; 5. Installing portion; 6. Connecting plate; 7. First installing groove; 8. First sliding block; 9. First slideway; 10. Movable support; 11. Second installing groove; 12. Second sliding block, 13. Second slideway; 14. Torsion gasket; 15. Kidney-shaped hole; 16. Sliding block; 17. Connecting fixed shaft; 18. Connecting shaft.

DETAILED DESCRIPTION OF THE INVENTION in order to make the objectives, technical solutions, and advantages of the disclosure clearer, the disclosure is further described in detail below in combination with the accompanying drawings and embodiments. It should be understood that the specific embodiments described here are only used to explain the disclosure, but not to limit the disclosure.

Figure 2:
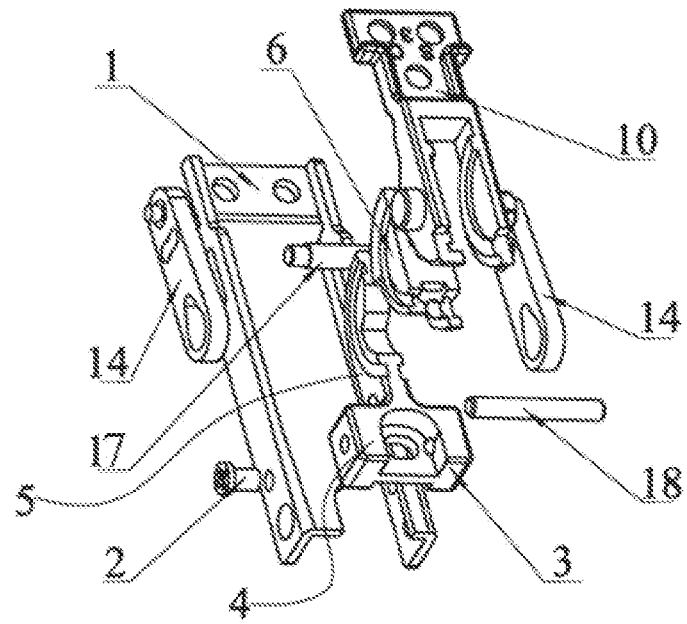
FIG. 2 is a structural schematic diagram after disassembly of the disclosure.

As shown in FIG. 1 and FIG. 2, an overturning and supporting rotating shaft for a tablet computer includes a fixed support t, wherein a connecting, fixed part 3 is fixedly arranged in the fixed support 1 by a fastener 2. According to the disclosure, a bolt can be selected as the fastener 2.

Figure 3:
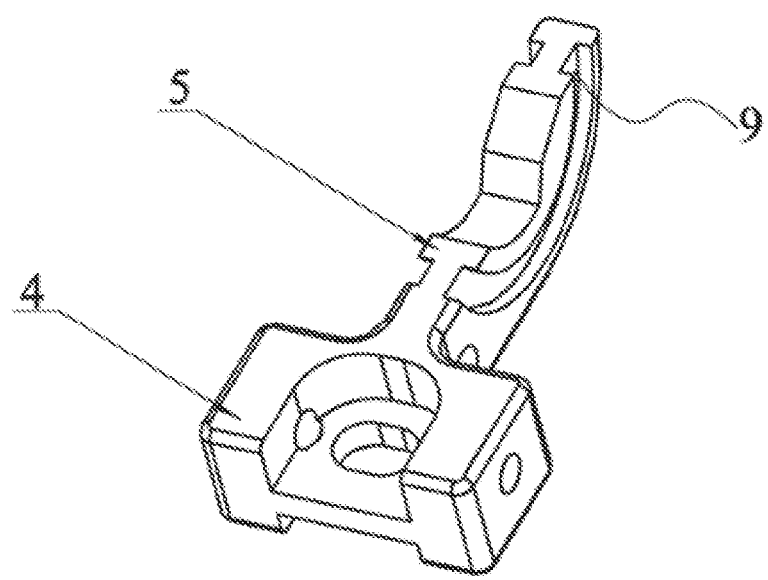
FIG. 3 is a structural schematic diagram of a connecting fixed part of the disclosure.

As shown in FIG. 2 and FIG. 3, the connecting fixed part 3 includes a fixed portion 4 which is fixedly arranged in the fixed support 1; an arc-shaped installing portion 5 is fixedly connected to one side of the fixed portion 4 and is inserted into a connecting plate 6.

Figure 4:
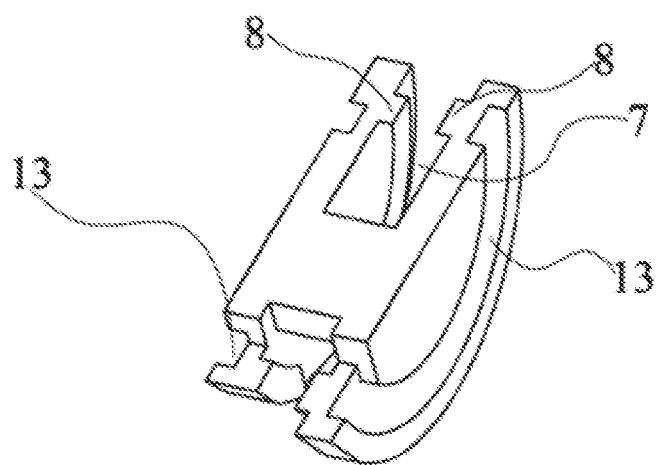
FIG. 4 is a structural schematic diagram of a connecting plate of the disclosure.

As shown in FIG. 2 and FIG. 4, the connecting plate 6 is located in the fixed support 1, a first arc-shaped installing groove 7 is formed in the connecting plate 6, and the installing portion 5 is inserted into the first installing groove 7; first arc-shaped sliding blocks 8 are arranged in the first installing groove 7; and first slideways 9 corresponding to the first sliding blocks 8 are arranged in the installing portion 5.

Figure 5:
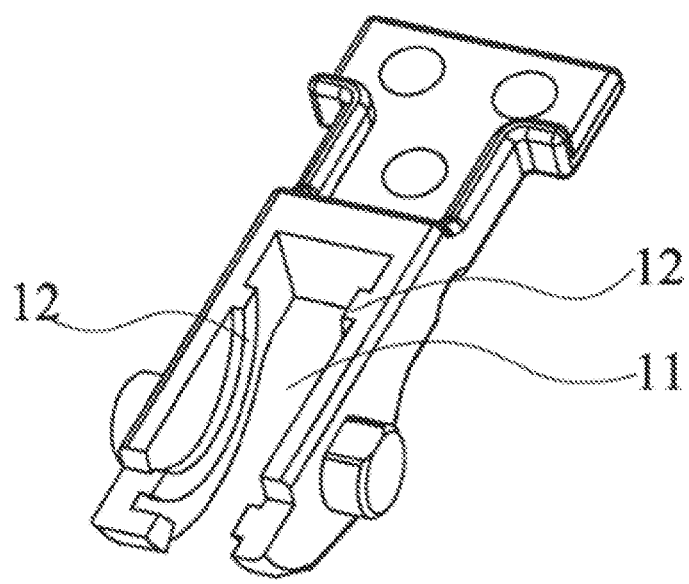
FIG. 5 is a schematic structural diagram of a movable supporting plate of the disclosure.

As shown in FIG. 2 and FIG. 5, the connecting plate 6 is inserted into the movable support 10 which is located in the fixed support 1; a second arc-shaped installing groove 11 is formed in the movable support 10, and the connecting plate 6 is inserted into the second installing groove 11; second arc-shaped sliding blocks 12 are arranged in the second installing groove 11; and second slideways 13 corresponding to the second sliding blocks 12 are arranged on the connecting plate 6. As shown in FIG. 1, a torsion washer 14 is arranged between each side of the movable support 10 and the fixed support 1, one side of each torsion gasket 14 is slidably arranged on the fixed support 1, and the other side of each torsion gasket 14 and the movable support 10 are in hinged connection.

Kidney-shaped holes 15 are formed in the fixed support 1, sliding blocks 16 are slidably arranged in the kidney-shaped holes 15 and are fixedly arranged on the torsion gaskets 14. A connecting fixed shaft 17 is fixedly arranged between two torsion gaskets 14.

A fixed shaft 18 for supporting the fixed support 1 is fixedly arranged between both ends of the fixed support 1.

When the overturning and supporting rotating shaft for the tablet computer is used, the rotation of the overturning and supporting rotating shaft within a range of 120 degrees is realized by insertion of arc-shaped structures among the connecting fixed part 3, the connecting plate 6 and the movable support 10, the structure design of the first arc-shaped sliding blocks 8 and the first slideways 9 between the connecting fixed part 3 and the connecting plate 6, the structure design of the second arc-shaped sliding blocks 12 and the second slideways 13 between the connecting plate 6 and the movable support 10, and rotary movement assisted by the connecting structure of the torsion gaskets 14 and the fixed support 1.

The above description is only the preferred embodiment of the disclosure and not intended to limit the disclosure. Any modifications, equivalent replacements, improvements and the like made within the spirit and principle of the disclosure shall fall within the scope of protection of the disclosure.

The invention claimed is:

1. An overturning and supporting rotating shaft for a tablet computer, comprising:
    a fixed support, wherein a connecting fixed part is fixedly arranged in the fixed support by a fastener;
    the connecting fixed part comprises a fixed portion, and the fixed portion is fixedly arranged in the fixed support; an arc-shaped installing portion is connected to one side of the fixed portion, and the arc-shaped installing portion is inserted into a connecting plate;
    the connecting plate is located in the fixed support, a first arc-shaped installing groove is formed in the connecting plate, and the arc-shaped installing portion is inserted into the first arc-shaped installing groove; first arc-shaped sliding blocks are arranged in the first arc-shaped installing groove; first slideways corresponding to the first arc-shaped sliding blocks are arranged in the arc-shaped installing portion;
    the connecting plate is inserted into a movable support, and the movable support is located in the fixed support;
    a second arc-shaped installing groove is formed in the movable support, and the connecting plate is inserted into the second arc-shaped installing groove; second arc-shaped sliding blocks are arranged in the second arc-shaped installing groove, and second slideways corresponding to the second arc-shaped sliding blocks are arranged on the connecting plate; and
    two torsion gaskets that are arranged between each side of the movable support and the fixed support, one side of each of the two torsion gaskets is slidably arranged on the fixed support, and the other side of each of the two torsion gaskets and the movable support are in hinged connection.

2. The overturning and supporting rotating shaft according to claim 1, wherein kidney-shaped holes are formed in the fixed support, and sliding blocks are slidably arranged in the kidney-shaped holes and are fixedly arranged on the two torsion gaskets.

3. The overturning and supporting rotating shaft according to claim 1, wherein a connecting fixed shaft is fixedly arranged between the two torsion gaskets.

4. The overturning and supporting rotating shaft according to claim 1, wherein a fixed shaft for supporting the fixed support is fixedly arranged between both ends of the fixed support.

* * * * *